United States Patent [19]

Woodward

[11] 4,413,644
[45] Nov. 8, 1983

[54] AUTOMATIC VACUUM BLEED VALVE FOR USE ON PAPER MAKING MACHINES

[75] Inventor: Derrick R. Woodward, Pointe Claire, Canada

[73] Assignee: Jwi Ltd., Kanata, Canada

[21] Appl. No.: 300,951

[22] Filed: Sep. 10, 1981

[51] Int. Cl.³ .............................................. G05D 16/06
[52] U.S. Cl. ................................. 137/103; 137/116.3;
137/DIG. 8; 162/364
[58] Field of Search ............... 137/103, 116.3, 596.18,
137/DIG. 8; 162/217, 363, 364, 381

[56] References Cited

U.S. PATENT DOCUMENTS

| | | | |
|---|---|---|---|
| 2,883,998 | 4/1959 | Broughton | 137/116.3 |
| 2,950,730 | 8/1960 | Svensson | 137/116.3 |
| 3,111,957 | 11/1963 | Broughton | 137/116.3 |
| 3,468,341 | 9/1969 | Newcomb et al. | 137/116.3 X |
| 3,766,933 | 10/1973 | Nicholson | 137/116.3 |

*Primary Examiner*—Gerald A. Michalsky
*Attorney, Agent, or Firm*—Alan Swabey; Robert Mitchell; Guy Houle

[57] ABSTRACT

An automatic adjustable vacuum bleed valve particularly, but not exclusively, for use with a suction box of a paper making machine. The valve defines a first chamber connected to the suction box. A second chamber extends within the body of the valve and is connectible to a vacuum source. A hollow cylindrical valve stem passes through the second chamber and has a stem valve secured thereto to seat in the port in a wall of the second chamber. A further valve is positioned concentrically with the valve stem and seats in an opening provided in the body. The further valve has a stem slidingly engaged in a lower end of the valve stem. An upper end of the cylindrical valve stem is flexibly connected to the valve body by an impervious diaphragm having opposed surfaces, one of which is exposed to atmosphere and the other exposed to the first chamber. The control flow of fluid, such as water, is introduced in the cylindrical valve stem. A restricting orifice is provided in the valve stem to restrict the flow of fluid and thereby control the pressure in the cylindrical valve stem to regulate the vacuum in the first chamber. The first and second chambers are in communication via the port in the second chamber housing.

10 Claims, 4 Drawing Figures

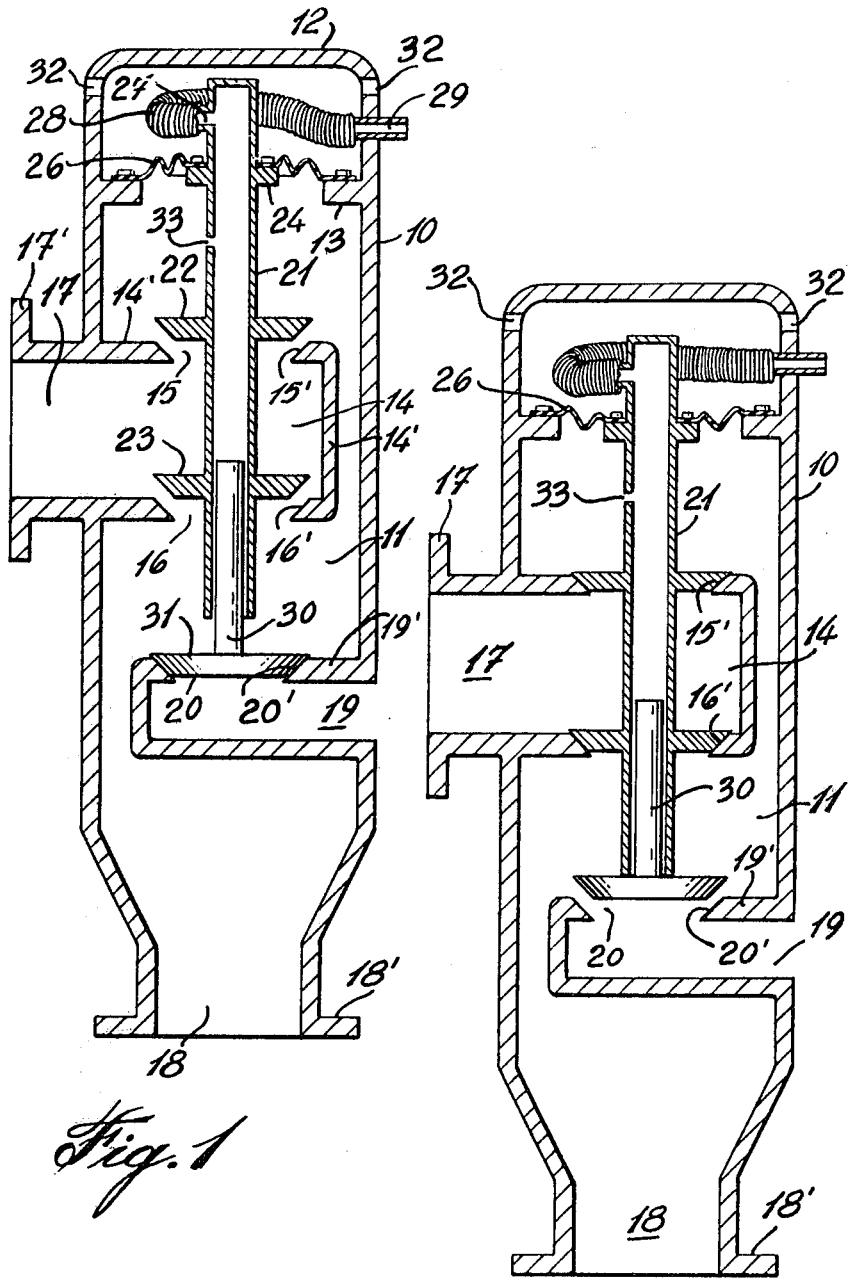

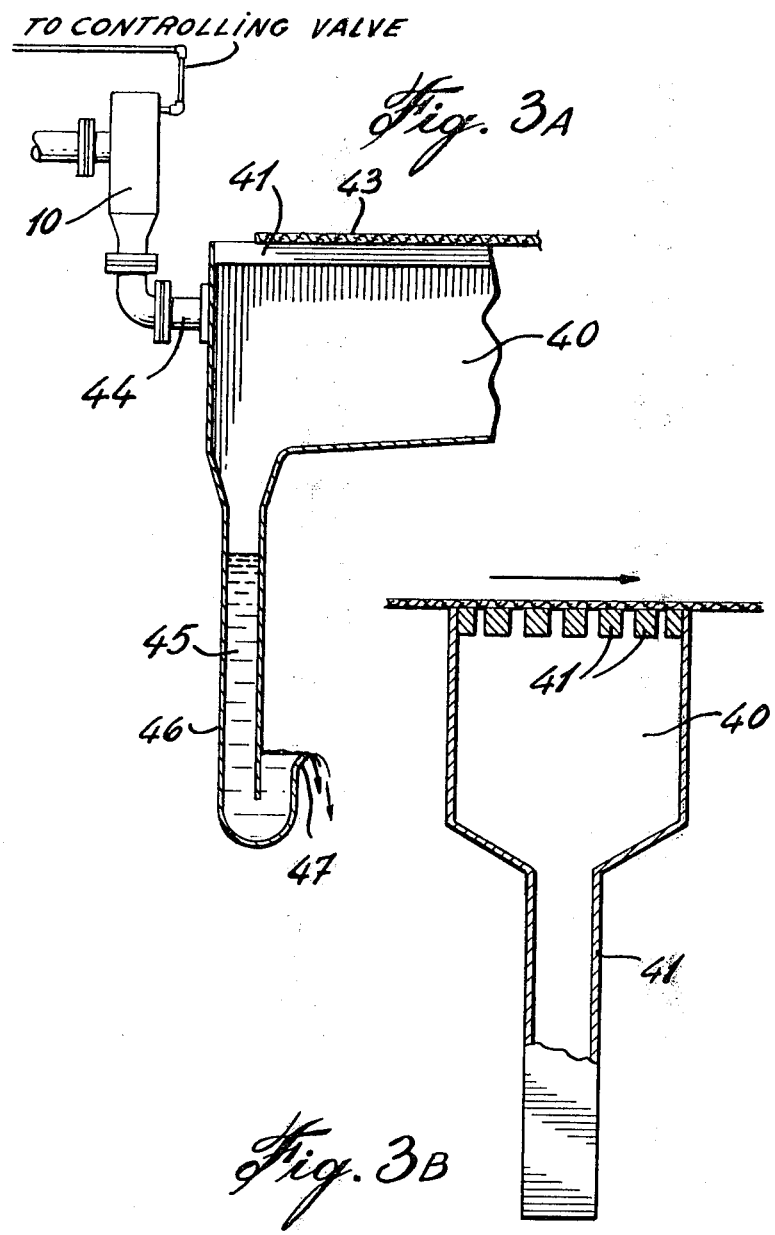

AUTOMATIC VACUUM BLEED VALVE FOR USE ON PAPER MAKING MACHINES

BACKGROUND OF INVENTION (a) Field of Invention

The present invention relates to an automatic adjustable vacuum bleed valve particularly, but not exclusively, for use with a suction box of a paper making machine.

(b) Description of Prior Art

Various operations of a paper making process depend on a vacuum to extract water from a thin suspension of pulp fibers. The automatic valve of the present invention is remotely controlled and maintains a vacuum in a vacuum box or other vacuum operated apparatus at a constant pre-set level. The valve is particularly effective at maintaining precise control at low vacuum levels. Advantages of the valve are that it has a very narrow fluctuation range, it is a relatively simple design for easy manufacture and maintenance, it is continuously self-cleaning, and it can be remotely controlled.

SUMMARY OF THE INVENTION

According to a broad aspect of the present invention there is provided an automatic adjustable vacuum bleed valve which comprises a valve body defining a first chamber connected to a vacuum operated device. An opening is provided in the body communicating the first chamber to atmosphere. A second chamber is provided within the body and is connectible to a vacuum source. The second chamber is defined by a chamber housing extending within the body. A hollow cylindrical valve stem passes through the second chamber housing and has a stem valve secured thereto for seating in a port in a wall of the second chamber housing. A further valve is positioned concentrically with the valve stem for seating in the opening in the body. The further valve has a stem slidingly engaged in a lower end of the valve stem. An upper end of the cylindrical valve stem is flexibly connected to the valve body by a flexible impervious diaphragm having opposed surfaces. One of the surfaces is exposed to atmosphere and the other is exposed to the first chamber. Means is provided for introducing the controlling flow of fluid into the cylindrical valve stem. A restricting orifice is provided in the valve stem to restrict the flow of fluid and thereby provide pressure control in the cylindrical valve stem to regulate the vacuum in the first chamber.

BRIEF DESCRIPTION OF DRAWINGS

The embodiment of the present invention will now be described with reference to the example thereof as illustrated in the accompanying drawings, and in which:

FIGS. 1 and 2 are diagrammatic cross-section views showing details of the valve and its operation; and FIGS. 3A and 3B are fragmented side and end views showing a section of a conventional low vacuum paper machine suction box with the valve of the invention installed thereon.

DESCRIPTION OF PREFERRED EMBODIMENTS

Referring to FIG. 1, the body of the valve is shown generally at 10. It is elongated and cylindrical in shape and comprises a first chamber 11. The valve is provided with a top cover 12, an inwardly projecting flange 13, an internal second chamber 14 provided with circular upper and lower valve ports 15 and 16, respectively, each having a bevelled valve seat 15' and 16'. Chamber 11 is provided with a bottom open end 18 connected to the suction box 40 (see FIGS. 3A and 3B) through inlet flange 18'.

The lower valve body is provided with a recess 19 which is open to the atmosphere and has a circular valve opening 20 with a bevelled valve seat 20' provided in transverse wall 19'. A cylindrical valve stem 21 is located centrally within chamber 11, passes through the second chamber 14, and is provided with circular upper and lower valves 22 and 23 adapted to seat on valve ports 15 and 16 respectively of the chamber housing 14'. Valve stem 21 is provided also with a flange 24 located approximately adjacent to flange 13 of valve body 10. Flanges 13 and 24 are interconnected with a circular, flexible impervious diaphragm 26. At its top end valve stem 21 is closed and an opening 27 near the top of the valve stem is connected with a flexible pipe line 28, within the valve body, to a pipe 29 which passes through the upper side of the valve body. Pipe 29 is connected to a remotely stationed fluid supply, not shown, through a flow control device, also not shown.

At its bottom, located within chamber 11, cylindrical valve stem 21 holds piston 30 which is the stem of circular valve 31 which engages with opening 20 and is bevelled accordingly.

The upper periphery of the valve body is provided with breather slots or holes 32 so that the upper side of diaphragm 26 is exposed to the atmosphere.

In operation the second chamber 14 is connected to the source of vacuum through outlet flange 17' about the large opening 17 and chamber 11 is connected to a suction box unit through opening 18.

Fluid pressure in cylindrical valve stem 21 forces piston 30 downward to seal opening 20 with valve 31. Upper and lower valve ports 15 and 16 are opened to allow access from the suction box to the vacuum source. When the vacuum in chamber 11 of the unit exceeds the amount determined by the fluid pressure in cylindrical valve stem 21, atmospheric pressure on the top side of diaphragm 26 forces the cylindrical valve stem downward to close valve ports 15 and 16. Atmospheric pressure on the bottom side of valve 31 forces it upward allowing air to bleed into chamber 11 thus lowering the vacuum in the system. This condition of the valve is shown in FIG. 2 and as the pressure not rises in chamber 11, diaphragm 26 lifts cylindrical stem 21 opening valves 22 and 23 and closing valve 29 again.

In this way the vacuum in chamber 11 and in the suction box to which it is connected is dependent upon the differential between atmospheric pressure and the fluid pressure in hollow cylindrical stem 21 and is maintained in equilibrium therewith. The vacuum in the system is raised or lowered by increasing or decreasing the flow of fluid in the hollow stem 21 and this may be controlled from an external source through rigid or flexible tubing leading to a conventional flow valve which may be stationed some distance from the valve. The flow of fluid in valve stem 21 is restricted by a small orifice 33 in the stem which induces pressure to build up within the stem to actuate valves 22, 23 and 31. Preferably, but not exclusively, the controlling fluid will be water.

Under normal conditions there will be enough moisture coming from the suction boxes and the orifice 33 to keep the valve ports lubricated and wet to ensure a good seal.

Because of the interconnection between valves 22, 23 and 31 and diaphragm 26 by a fluid pressure, valves 22 and 23 can only be open when valve 31 is closed and valve 31 can only be open when valves 22 and 23 are closed.

In FIGS. 3A and 3B numeral 40 denotes the suction box structure having a cover 41, which in this case is shown as a slotted type having fabric supporting bars 41 which are slidably mounted on rails by T-connections as taught in U.S. Pat. No. 3,629,058. Numeral 43 denotes the forming fabric, 44 is the exhaust pipe and 45 is a downcomer which is made an integral part of the suction box and serves to collect water, shown at 46, under a vacuum head and permits removal of surplus collected water over lip 47 while maintaining a negative pressure differential. The vacuum control valve of the invention, 10 is connected to exhaust pipe 44 as shown.

While the valve of the invention is well adapted to function in a paper making process, it may also be applied to any other process where it is required to continually maintain vacuum precisely at a pre-set level and at a remote station.

It is within the ambit of the present invention to provide any obvious modifications of the example of the preferred embodiment described herein. For example, the hollow cylindrical valve stem may be provided with a single valve, such as 22 or 23 and in place of the other valve a diaphragm could be connected between the cylindrical body 21 and a port or hole provided in one of the opposed walls of the second chamber housing. Furthermore, the top of the valve body could be terminated at the diaphragm without the need of an upper housing. However, the upper housing provided is to prevent foreign matter from depositing on the top surface of the diaphragm. Still further, the disposition of the openings of the first and second chambers may be different than that herein shown and the opening in the first chamber could be provided in a bottom wall of the chamber with the opening connecting to the vacuum device being provided in another area of the valve body, such as diametrically opposite to the opening of the vacuum chamber. All of such modifications and others are intended to be covered by the appended claims.

I claim:

1. An automatic adjustable vacuum bleed valve comprising a valve body defining a first chamber connected to a vacuum operated device, an opening in said body communicating said first chamber to atmosphere, a second chamber within said body and connectible to a vacuum source, said second chamber being defined by a chamber housing extending within said body, a hollow cylindrical valve stem passing through said chamber housing and having a stem valve secured thereto for seating in a port in a wall of said chamber housing, a further valve positioned concentrically with said valve stem for seating in said opening in said body, said further valve having a stem slidingly engaged in a lower end of said valve stem, an upper end of said cylindrical valve stem being flexibly connected to said valve body by a flexible impervious diaphragm having opposed surfaces, one of said surfaces being exposed to atmosphere and the other of said surfaces being exposed to said first chamber, means for introducing a controlling flow of fluid into said cylindrical valve stem, and a restricting orifice in said valve stem to restrict the flow of fluid and thereby provide pressure control in said cylindrical valve stem to regulate the vacuum in said first chamber.

2. A bleed valve as claimed in claim 1 wherein said cylindrical valve stem is provided with two spaced apart stem valves each associated with a respective one of two axially aligned ports, one in a respective one of opposed walls of said chamber housing.

3. A bleed valve as claimed in claim 2 wherein said stem valves and said further valve are disc valves having a bevelled circumferential edge for seating in a bevelled peripheral edge of its associated port or opening.

4. A bleed valve as claimed in claim 1 wherein said valve body further defines an upper chamber for housing said upper end of said cylindrical stem valve, passage means in said upper chamber to communicate said chamber with atmosphere, and conduit means constituting said means for introducing fluid in said cylindrical valve stem.

5. A bleed valve as claimed in claim 4 wherein said conduit means comprises an orifice in a wall of said upper chamber, a flexible pipe interconnecting an interior side of said orifice to the interior of said hollow cylindrical valve stem, and a further conduit interconnecting an exterior side of said orifice to a remote fluid source.

6. A bleed valve as claimed in claim 5 wherein said fluid is water, said restricting orifice being a through bore in said cylindrical valve stem located for communication with said first chamber.

7. A bleed valve as claimed in claim 1 wherein said valve body is an elongated cylindrical body, said cylindrical valve stem being retained substantially on the central longitudinal axis of said body, an upper chamber defined between a top wall of said body and a circumferential inner flange, said diaphragm being secured about said inner flange, said second chamber being disposed transversely of said body and having its chamber housing projecting into said body, said chamber housing having opposed parallel flat walls each having a valve port axially aligned with one another, said cylindrical valve stem having two spaced apart stem valves seatingly engageable in a respective one of said ports, said opening in said body being axially aligned with said aligned ports in said chamber housing.

8. A bleed valve as claimed in claim 7 wherein said second chamber has a large open end exteriorly of said body, connector means about said open end to secure said chamber to said vacuum source, said body having an open bottom end, said first chamber being defined between said open bottom end and said diaphragm, further connector means about said open bottom end to secure said first chamber to said vacuum operated device.

9. A bleed valve as claimed in claim 8 wherein said body is provided with a recess intermediate said bottom open end and said second chamber, said recess defining a transverse wall extending into said first chamber, said opening being provided in said transverse wall.

10. A bleed valve as claimed in claim 1 wherein said vacuum operated device is a suction box as utilized in a paper making machine.

* * * * *